Aug. 28, 1962  M. B. ANDREWS  3,051,604
METHOD OF MAKING LAMINATED TAPE
Filed Sept. 30, 1959
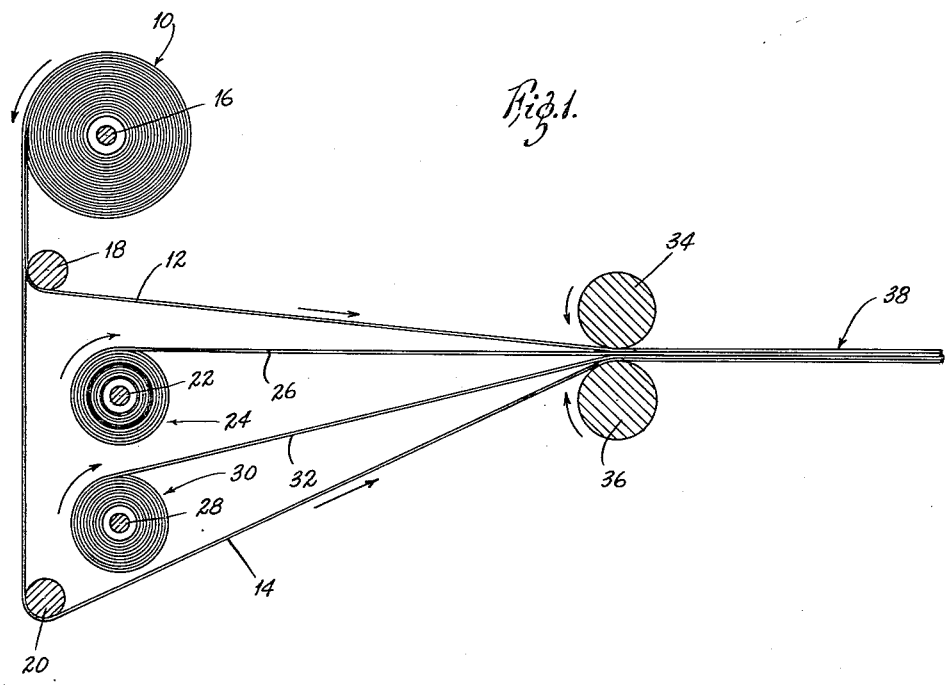
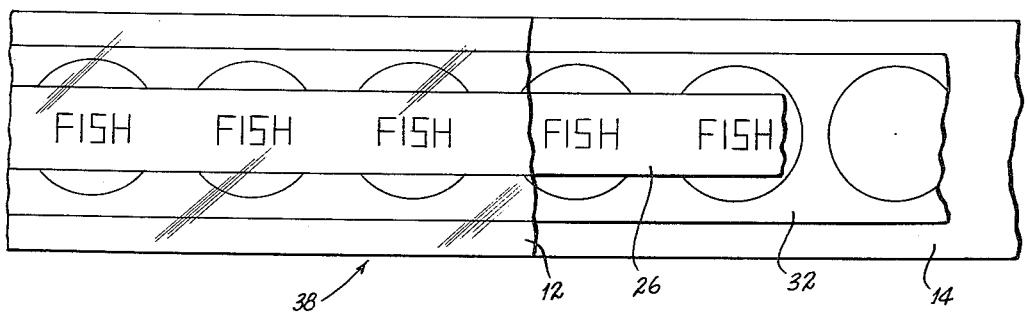
INVENTOR:
MARK B. ANDREWS,
BY Kingsland, Rogers & Ezell
ATTORNEYS

United States Patent Office 3,051,604
Patented Aug. 28, 1962

3,051,604
METHOD OF MAKING LAMINATED TAPE
Mark B. Andrews, 1916 N. Signal Hills Drive,
St. Louis 22, Mo.
Filed Sept. 30, 1959, Ser. No. 843,508
4 Claims. (Cl. 156—152)

The present invention relates generally to the laminated tape art, and more particularly to a novel method of making a laminated tape.

In brief, the present invention comprises separating pressure sensitive label stock consisting of an opaque liner and a transparent tape with pressure sensitive transparent adhesive, inserting therebetween multiple selected plain or printed strip layers, and relaminating to produce a laminated tape having a repetitious, continuous or other pattern which may be rolled for subsequent use or subjected immediately to other steps, as die cutting, perforating, sheeting, or the like.

Therefore, an object of the present invention is to provide a novel method of making a complicated laminated tape by delamination and relamination.

Another object is to provide a novel method of making a laminated tape which incorporates multiple strips between pressure sensitive label stock which may be separated into a plurality of laminated units.

Another object is to provide a novel method of making a laminated tape which is inexpensive and which may be readily employed in the making of laminated tabs, tags, labels, and the like, in which the label is protected by a transparent cover.

The foregoing and other objects and advantages are apparent from the following description taken with the accompanying drawing, in which:

FIGURE 1 is a diagrammatic view illustrating the steps in the present novel method of making a laminated tape; and FIGURE 2 is a plan view of a segment of laminated tape made by the present novel method, the layers being successively broken away for clarity of illustration.

Referring to the drawing more particularly by reference numerals, 10 indicates generally a conventional roll of pressure sensitive label stock comprising a transparent layer 12 coated on the back with transparent pressure sensitive adhesive and a liner layer 14. The roll 10 is freely rotatable on a shaft 16, and is separated by training the transparent layer 12 about an idler shaft 18 and the liner layer 14 about an idler shaft 20.

Freely mounted on shafts 22 and 28 are rolls 24 and 30 of continuous paper strips 26 and 32, which may be printed, plain, scored, or otherwise treated. The strips 26 and 32 may comprise other selected material. Both rolls 24 and 30 are disposed between the separated layers 12 and 14, as is clearly shown in FIGURE 1.

The separated layers 12 and 14 and the strips 26 and 32 are drawn through opposed pressure rolls 34 and 36, as illustrated, thereby providing a laminated tape 38. The pressure rolls 34 and 36 are influenced towards each other and are driven by a source of power not shown to effect movement therethrough of the tape 38. A segment of tape 38 is shown in FIGURE 2. The tape 38 may be wound upon a core for sale and use, or it may be subjected immediately to separation into small segments or units, to die cutting of a repetitious design, to perforation, to sheeting, or the like.

It is to be understood that the strips 32 and 26 may be printed with a repetitious or continuous design, as a label, for example, and may have adhesive on the back for engagement with the liner layer 14. They may be of selected widths and material. The transparent layer 12 protects the label surface against alteration, smudging, etc.

It is apparent that there has been provided a novel method of making a laminated tape which fulfills the objects and advantages sought.

It is to be understood that the foregoing description and the accompanying drawing have been given by way of illustration and example. It is also to be understood that changes in form of the several parts, substitution of equivalent elements or steps, and rearrangement of parts or steps, which will be readily apparent to one skilled in the art, are contemplated as within the scope of the present invention, which is limited only by the claims which follow.

What is claimed is:

1. The method of making a laminated tape comprising the steps of freely mounting a roll of transparent pressure sensitive label stock on a shaft, continuously separating the adhesive layer from the liner layer, freely mounting two rolls of paper strip adjacent the label stock roll, continuously leading the adhesive layer and the liner layer about the two rolls of paper strip in opposed relation, continuously leading the paper strips from the rolls in overlaying relation, and continuously leading the paper strips, the adhesive layer, and the liner layer between pressure rolls forcing them into a laminated tape.

2. A method of making a laminated tape comprising the steps of continuously delaminating transparent pressure-sensitive label stock to separate the adhesive carrying layer from the liner layer, continuously disposing a plurality of continuous strips of material in overlaying relation and between said separated layers of the label stock, and thereafterwards continuously pressing said layers of label stock into trapping relation with said continuous strips to provide a laminated tape.

3. The method of making a laminated tape comprising at least one printed layer between a pressure sensitive layer and a liner layer comprising the steps of placing a roll of label stock having a pressure sensitive adhesive layer and a liner layer in position for unrolling, unrolling the roll of label stock while feeding the adhesive layer about one roller with the adhesive side disposed away from the roller and feeding the liner layer about another roller, thereby separating the adhesive layer from the liner layer, drawing the separated adhesive and liner layers between a pair of pressure rollers with the adhesive side of the adhesive layer facing the liner layer, and feeding at least one additional strip layer of narrower width than that of the adhesive and liner layers between the adhesive layer and the liner layer prior to their passage between the pressure rollers, whereby all the layers are pressed together by the pressure rollers and held together by the pressure sensitive adhesive.

4. The method of claim 3, but feeding at least two strip layers between the adhesive layer and the liner layer prior to their passage between the pressure rollers, one of the strip layers being of narrower width than that of the adhesive and liner layers and the other liner layer being of still narrower width, the narrower of the two strip layers being closest to the adhesive layer.

References Cited in the file of this patent

UNITED STATES PATENTS

| | | |
|---|---|---|
| 1,452,379 | Haren | Apr. 17, 1923 |
| 2,789,640 | Belden | Apr. 23, 1957 |
| 2,805,183 | Higgins | Sept. 3, 1957 |